(12) United States Patent
Blackwell et al.

(10) Patent No.: US 6,259,680 B1
(45) Date of Patent: Jul. 10, 2001

(54) METHOD AND APPARATUS FOR ECHO CANCELLATION

(75) Inventors: Steven R. Blackwell; Richard L. Goodson, both of Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 08/941,911

(22) Filed: Oct. 1, 1997

(51) Int. Cl.⁷ ................................................. H04B 3/20
(52) U.S. Cl. ............................................... 370/286
(58) Field of Search ........................... 370/201, 286–292; 379/3, 406, 410; 348/611; 455/570

(56) References Cited

U.S. PATENT DOCUMENTS

| | | | |
|---|---|---|---|
| 4,594,479 | * 6/1986 | Farrow et al. | 379/3 |
| 5,561,424 | * 10/1996 | Norsworthy et al. | 341/126 |
| 5,793,801 | * 8/1998 | Fertner | 375/219 |
| 5,917,809 | * 6/1999 | Ribner et al. | 370/286 |

* cited by examiner

Primary Examiner—Melvin Marcelo
Assistant Examiner—Jasper Kwoh
(74) Attorney, Agent, or Firm—Brumbaugh Graves Donohue & Raymond; John A. Fogarty, Jr.

(57) ABSTRACT

The present invention relates to an improved method and apparatus for echo cancellation in a communication system utilizing a bidirectional transmission medium. The invention significantly reduces computational overhead associated with echo cancellation by using sub-Nyquist sampling in the echo path. In particular, the invention relates to a method and apparatus for echo cancellation in a communication system utilizing different signaling or baud rates in the transmit and receive directions, whereby the computational overhead of the echo cancellation is significantly reduced as compared to traditional methods. In a preferred embodiment herein, the present invention reduces by one-half the computational overhead associated with echo cancellation in a data communications system utilizing symmetrical information rates at asymmetrical signal rates.

8 Claims, 3 Drawing Sheets

METHOD AND APPARATUS FOR ECHO CANCELLATION

BACKGROUND OF THE INVENTION

The present invention relates to an improved method and apparatus for echo cancellation in communication systems utilizing bidirectional transmission media such as copper wire twisted pairs, air, water, and outer space. In particular, the invention relates to a method and apparatus for echo cancellation in a communication system utilizing different signaling or baud rates or different spectral shapes in the transmit and receive directions, whereby the computational overhead of the echo cancellation is significantly reduced as compared to conventional methods. In preferred embodiments described herein, the present invention obtains benefits not obtainable in the prior art, e.g., the present invention reduces by one-half the computational overhead associated with echo-cancellation in a data communications system utilizing symmetrical information rates at asymmetrical signal rates.

Signals, i.e., the intelligence, message or effect conveyed over a communication system, are susceptible to the unwanted effects of echoes. Echoes are those signal components that represent a delayed and distorted version of the original transmitted signal reflected back into the source or a receiver near the source. Consequently, echoes are superimposed upon useful signals, thus distorting the useful signal and impairing communication quality.

For example, in an acoustic system comprised of a microphone and a loudspeaker, echoes cause the received signal at the microphone to be distorted. This distortion occurs as a result of acoustic coupling between the microphone and the loudspeaker, and detection by the microphone of reflections of the sound waves generated at the loudspeaker.

Likewise, signals transmitted over telephone lines in a full-duplex mode, i.e., signals transmitted in two directions simultaneously, are susceptible to the effects of echo. In typical telephone networks comprised of two-wire loops (the "subscriber loops") and four-wire loops (the "long-haul" loops) echo distortion is caused by the mismatch between the characteristic impedance of directional couplers, or hybrids, and the input impedance of the line. In such a system, the two-wire loop is used for full-duplex transmission, whereas the four-wire loop (comprised of two separate two-wire loops) is used for half-duplex transmission. These loops are coupled together by directional couplers such as two-wire to four-wire ("2W/4W") hybrid coupling circuits located at the near and far ends of the two-wire loops.

However, because of inherent impedance mismatches between the couplers and the telephone lines, directional couplers contribute two forms of echoes, i.e., near-end echoes and far-end echoes. Near-end echoes are generated by energy leaking through the first hybrid encountered by the transmitted signal. For example, in communication systems comprised of remote site ("upstream") and central office ("downstream") site transceivers, near-end echoes are caused by transmit energy leaking across the remote site hybrid into the remote site receiver, thereby corrupting the information received at the remote site. Near-end echo is further characterized by high amplitude and short time delay.

Far-end echoes on the other hand are generated by energy leaking through the hybrid at the far end of the circuit. In the example discussed above, a mismatch between line and hybrid impedances at the central office site causes remote site transmitted energy to leak across the central office hybrid. This energy is reflected back into the remote site receiver along with the incoming signal transmitted from the central office. In contrast to near-end echo, far-end echo is characterized by weaker amplitude and longer time delay.

Consequently, echo cancelers have been used to minimize the effects of echo distortion in communication systems susceptible to echo. Examples of such systems include full-duplex, two-wire telecommunication systems. See Jean-Jacques Werner, "An Echo Cancellation-Based 4800 Bit/s Full-Duplex DDD Modem," *IEEE Journal on Selected Areas in Communications*, vol. SAC-2, no. 5, p. 722 (September 1984); Loic Guidoux, "Echo Canceling on Full-Duplex Dial-Up Modems," *Data Communications*, p. 227 (September 1983).

Echo cancelers in these and other systems operate by subtracting a replica of the echo of the original signal from the received signal. In the above-mentioned remote site-central office system example, the echo component of the incoming signal at the remote site is replicated from the transmitted signal at the remote site. The echo can be replicated by first storing in the echo canceler each of a predetermined number of previous consecutive symbols in the transmitted signal. Each symbol is then multiplied by a respective tap coefficient set during training of the echo canceler. The resulting products are summed to produce the replicated echo, which in turn is subtracted from the incoming signal at the remote site receiver input. The resulting echo compensated signal is then processed to retrieve the desired information from the received signal.

For the replicated echo to be properly subtracted from the received signal, the canceler must be operated such that replication, sampling of the incoming signal, and echo cancellation (subtraction of the replication from the incoming signal) occur at the same signal rate. Consequently, for fully symmetrical information services, echo cancelers have been operated at the baud rate, i.e., the symbol or signal rate, and at the Nyquist rate, i.e., a rate equal to at least twice the highest possible frequency present in the incoming signal. See U.S. Pat. No. 4,087,654, "Echo Canceler for Two-Wire Full-Duplex Data Transmission," issued to K. H. Mueller; U.S. Pat. No. 4,535,206, "Echo Cancellation in Two-Wire Full-Duplex Data Transmission With Estimation of Far-End Data Components," issued to D. D. Falconer.

For fully asymmetrical services such as Asymmetric Digital Subscriber Line ("ADSL" service) replication, sampling, and cancellation have been based on the transmit sample clock rate, i.e., the transmit rate of the central office. See "Echo Cancellation for Asymmetrical Digital Subscriber Lines," *IEEE Int'l Conference on Communications*, p. 301 (May 1994). In such as system, the echo compensated signal is subsequently interpolated to generate the appropriate receiver samples. However, this method is computationally inefficient at the remote site since echo cancellation is performed over the wider bandwidth of the central office transmit signal.

Consequently, the ADSL solution emphasizes the major shortcoming of traditional echo cancellation methods embodied in the prior art. These methods can be unnecessarily computationally intensive and costly.

Prior art echo cancelers are also inefficient in communication systems utilizing, for example, symmetric information rates at asymmetric signaling or baud rates or with asymmetrical spectral shapes. Such communication systems have been recently proposed for the single-pair High-Bit-Rate Digital Subscriber Loop ("HDSL2"). See Kevin Schneider and Richard Goodson, "A Modulation Technique for CSA Range HDSL2," *T1E1.4 Technical Subcommittee Working Group*, T1E1.4/97-xxx(February 1997) and M. Rude, H. Taktori, and G. Zimmerman, A proposal for HDSL2 Transmission: OPTIS, T1E1.4/97-238 (Jun. 30–Jul. 2, 1997).

It is, therefore, a principal objective of the present invention to provide a new method and apparatus for echo cancellation in a communication system utilizing a bidirectional transmission medium.

It is another object of the present invention to provide a new method and apparatus for echo cancellation in a communication system utilizing different signaling or baud rates in the transmit and receive directions.

It is another object of the present invention to provide a new method and apparatus for echo cancellation in a communication system utilizing symmetrical information rates at asymmetrical signal rates.

It is yet another object of the present invention to provide a new method and apparatus for echo cancellation that are characterized by significantly reduced computational overhead as compared with conventional methods and conventional apparatus.

It is a further object of the present invention to provide a significantly more efficient and economical method and apparatus for echo cancellation in an HDSL2 system.

SUMMARY OF THE INVENTION

In accordance with the present invention, a method for echo cancellation in a communication system utilizing a bidirectional transmission medium comprises the steps of: (a) generating a first signal at a first signaling rate within a first frequency band, the first signal characterized by an echo at the first signaling rate within the first frequency band; (b) transmitting the first signal in a first direction through a bidirectional medium; (c) receiving a second signal in a second direction through the bidirectional medium at a second signaling rate within a second frequency band, the first and second frequency bands being partially overlapped; (d) canceling the echo from the second signal, the canceling step including the step of replicating an echo within the second frequency band, whereby the echo canceling is performed within the second frequency band.

In further accordance with the present invention, a method for echo cancellation in a communication system utilizing a bidirectional transmission medium comprises the steps of: (a) transmitting a first signal in a first direction through the medium at a first signaling rate within a corresponding first bandwidth, the first signal characterized by an echo at the first signaling rate within the first bandwidth; (b) receiving a second signal in a second direction through the medium at a second signaling rate within a corresponding second bandwidth, such that the first and second bandwidths are partially overlapped, the step of receiving the second signal further comprising the steps of (i) filtering the second signal such that all transmit energy above a Nyquist rate corresponding to the second signal is eliminated, and (ii) sampling the second signal at a sampling rate that is equal to or greater than the Nyquist rate for the second signal; and (c) canceling the echo from the second signal, the canceling step comprising the steps of (i) converting the first signal into a signal having a sampling rate less than a Nyquist sampling rate for the first signal, but equal to the sampling rate for the second signal, (ii) replicating an echo signal at a sampling rate equal to the sampling rate for the second signal, and (iii) subtracting the replicated echo signal from the second signal whereby the echo canceling is performed within the second bandwidth.

In further accordance with the present invention, a method for echo cancellation in a communication system utilizing a bidirectional transmission medium and transmitting information at symmetrical information rates comprises the steps of: (a) transmitting a first signal in a first direction through the medium at a first signaling rate within a corresponding first bandwidth, the first signal characterized by an echo at the first signaling rate within the first bandwidth; (b) receiving a second signal in a second direction through the medium at a second signaling rate within a corresponding second bandwidth, such that the first and second bandwidths are partially overlapped, the step of receiving the second signal further including the steps of (i) filtering the second signal such that all transmit energy above a Nyquist rate corresponding to the second signal is eliminated, and (ii) sampling the second signal at a sampling rate that is greater than or equal to a Nyquist rate for the second signal; and (c) canceling the echo from the second signal, the canceling step comprising the steps of (i) converting the first signal into a signal having a sampling rate less than a Nyquist sampling rate for the first signal, but equal to the sampling rate for the second signal, (ii) replicating an echo signal at a sampling rate equal to the sampling rate for the second signal, and (iii) subtracting the replicated echo signal from said second signal whereby the echo canceling is performed within the second bandwidth.

Additionally, in accordance with the present invention, an apparatus for echo cancellation in a communication system utilizing a bidirectional transmission medium comprises (a) an information source for generating a first signal at a first signaling rate within a first frequency band, the first signal being characterized by an echo at the first signaling rate within the first frequency band; (b) a transmitter for transmitting the first signal in a first direction through the bidirectional medium; (c) a receiver for receiving a second signal in a second direction through the bidirectional medium at a second signaling rate within a second frequency band, the first and second frequency bands being partially overlapped; and (d) an echo canceler for canceling the echo from the second signal, the canceler comprising an echo replica unit for replicating an echo within the second frequency band, the combination being so constructed and arranged that the echo canceling is performed within the second bandwidth.

In further accordance with the present invention, an apparatus for echo cancellation in a communication system utilizing a bidirectional transmission medium and transmitting information at symmetrical information rates comprises: (a) a transmitter for transmitting a first signal in a first direction through the bidirectional medium at a first baud rate within a corresponding first bandwidth, the first signal characterized by an echo at the first baud rate within the first bandwidth, the transmitter further comprising (i) a sampler for sampling the first signal at fractionally-spaced intervals, (ii) a shaping filter for shaping the sampled signal, (iii) a digital-to-analog converter for converting the shaped signal to an analog transmit signal at a transmit sampling rate, (iv) a transmit analog filter for filtering the analog transmit signal, and (v) a directional coupler; (b) a receiver for receiving a second signal in a second direction through the bidirectional medium at a second baud rate within a corresponding second bandwidth such that the first and second bandwidths are partially overlapped, the receiver comprising (i) a directional coupler, (ii) a receive analog filter for filtering the second signal, and (iii) an analog-to-digital converter for converting the filtered signal into a digital signal representative of the second signal; and (c) an echo canceler for canceling the echo from the second signal, the echo canceler comprising (i) a sampler for sampling the first signal at fractionally-spaced intervals to convert the first signal into a signal having a sampling rate less than a Nyquist sampling rate for the first signal, but equal to the sampling rate for the converted second signal, (ii) an echo replica unit for replicating an echo signal at a sampling rate equal to the sampling rate for the second signal, and (iii) an algebraic adder for subtracting the replicated echo signal from the converted second signal, whereby the echo canceling is performed within the second bandwidth.

DETAILED DESCRIPTION OF THE INVENTION

Figure 1:
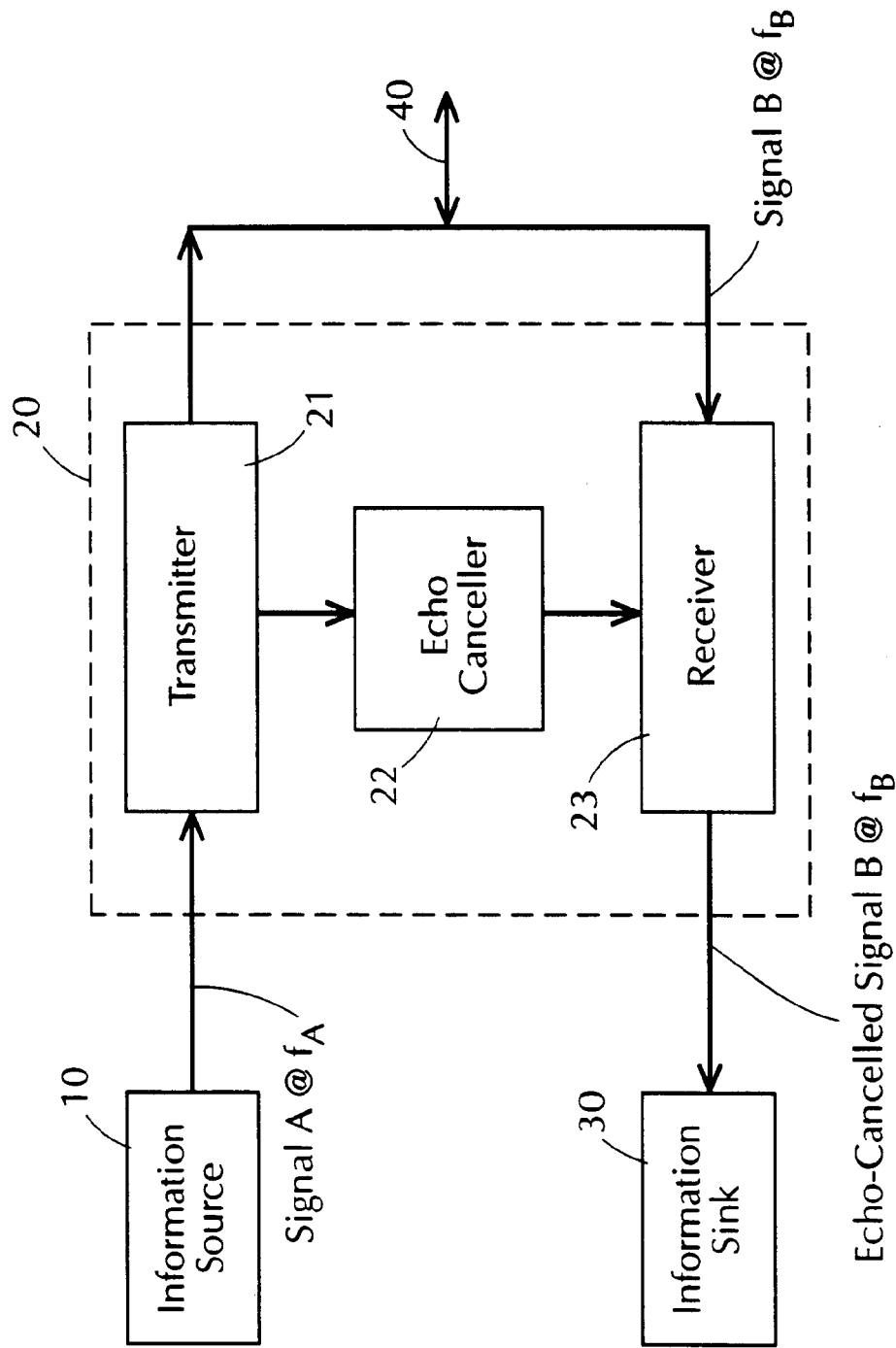
FIG. 1 is a preferred embodiment of the present invention.

FIG. 1 depicts an apparatus constructed and arranged in accordance with the present invention for implementing a method for echo cancellation in a communication system utilizing a bidirectional transmission medium. In accordance with the invention, the method comprises the steps of: (a) generating a first signal at a first signaling rate in a first frequency band, the first signal being characterized by an echo at the first signaling rate within the first frequency band; (b) transmitting the first signal in a first direction through a bidirectional medium; (c) receiving a second signal in a second direction at a second signaling rate within a second frequency band, the first and second frequency bands being partially overlapped; and (d) canceling the echo from the second signal, the canceling step including the step of replicating an echo within the second frequency band, whereby the echo canceling is performed within the second frequency band.

With reference to FIG. 1, an echo cancellation method and apparatus constructed and arranged in accordance with the present invention comprises an information source 10 generating a signal A at a signaling rate $f_A$ lying within frequency band $BW_A$. Transmitter 21 within transceiver 20 transmits information, e.g., digital data, audio signals, or the like information signals through bidirectional medium 40, while receiver 23 receives signal B at a signaling rate of $f_B$ lying in a band $BW_B$ which is bound for information sink 30. The information communicated on bidirectional medium 40 in the present embodiment can be in the form of electrical signals as applied in systems such as mobile radio, satellite or telephone communications systems, or sound waves as applied in acoustic systems. Furthermore, bidirectional medium 40 can be any transmission medium such as copper wire twisted pairs, air, water, or outer space.

In accordance with the present embodiment, signal B is characterized by a signaling rate $f_B$ lying within frequency band $BW_B$, which partially overlaps frequency band $BW_A$. The replicated echo from echo canceler 22 is then subtracted from signal B in receiver 23. Consequently, the method embodied by the apparatus of FIG. 1 performs echo cancellation over the partially overlapped frequency band $BW_B$, thus improving echo cancellation efficiency by eliminating unnecessary computations corresponding to the higher frequencies lying between the band $BW_A$ cut-off frequency and $BW_B$ cut-off frequency.

Figure 2:
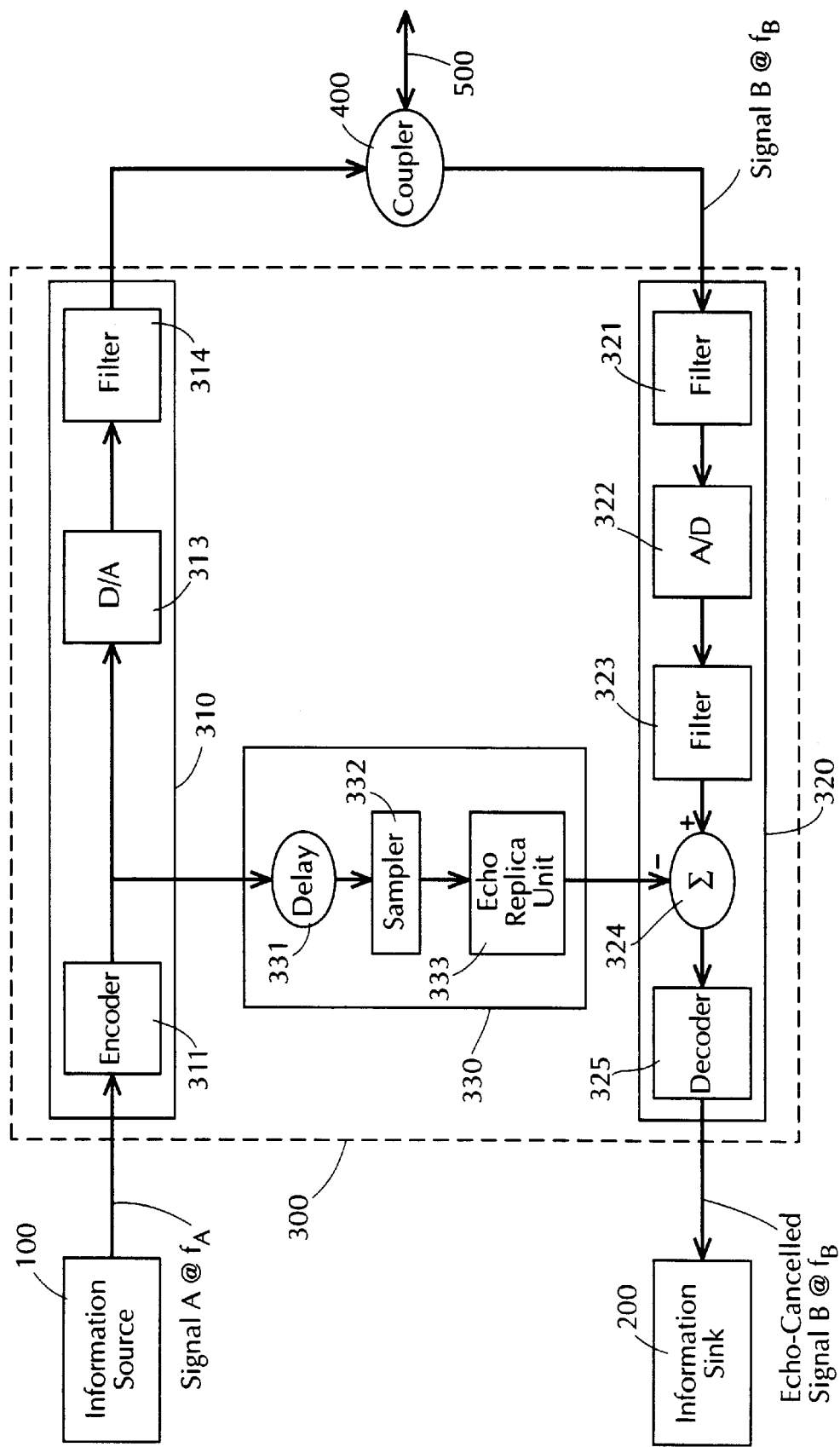
FIG. 2 is a second preferred embodiment of the present invention.

FIG. 2 depicts a second preferred embodiment of an apparatus constructed and arranged in accordance with the present invention and embodying the present invention's method for echo cancellation in a communication system utilizing a bidirectional transmission medium. In accordance with the invention, the method embodied in FIG. 2 comprises the steps of: (a) transmitting a first signal in a first direction through the medium at a first signaling rate within a corresponding first bandwidth, the first signal characterized by an echo at the first signaling rate within the first bandwidth; (b) receiving a second signal in a second direction through the medium at a second signaling rate within a corresponding second bandwidth, such that the first and second bandwidths are partially overlapped, the step of receiving the second signal further comprising the steps of (i) filtering the second signal such that all transmit energy above a Nyquist rate corresponding to the second signal is eliminated, and (ii) sampling the second signal at a sampling rate that is equal to or greater than the Nyquist rate for the second signal; and, (c) canceling the echo from the second signal, the canceling step further comprising the steps of (i) converting the first signal into a signal having a sampling rate less than a Nyquist sampling rate for the first signal, but equal to the sampling rate for the second signal, (ii) replicating an echo signal at a sampling rate equal to the sampling rate for the second signal, and (iii) subtracting the replicated echo signal from the second signal, whereby the echo canceling is performed in the second bandwidth.

Referring to FIG. 2, an echo cancellation method and apparatus constructed and arranged in accordance with the present invention comprises information source 100 providing outgoing information to transceiver 300 and directional coupler 400 for communication through a bidirectional medium 500. Transceiver 300 receives incoming signal B bound for information sink 200 from the bidirectional medium 500. By way of example and not limitation, the information communicated on bidirectional medium 500 comprises electrical signals as applied in systems such as mobile radio, satellite, and telecommunications systems. Furthermore, bidirectional medium 500 can be any suitable transmission media, e.g., copper wire twisted pairs, air, or outer space.

Referring to FIG. 2, transceiver 300 comprises transmitter 310 and receiver 320. Transmitter 310 and receiver 320 comprise conventional components required by the specific application. For example, in a mobile radio communications application, a transceiver site comprises an appropriate base station or portable transceiver equipment. See Robert G. Winch, *"Telecommunication Transmission Systems,"* (1993). In yet another example, a digital data transmission system transmitting data over local loops from a central office to a plurality of subscriber sites comprises transmitters and receivers with conventional channel coders, line coders, modulators and demodulators, equalizers, precoders, decoders, and decision devices as required by the specific application. See S. V. Ahamed, P. P. Bohn and N. L. Gottfried, "A Tutorial on Two-Wire Digital Transmission in the Loop Plant," *IEEE Transactions on Communications*, vol. COM-29, no. 11, p. 1554 (November 1981); TR-28, "A Technical Report on High-Bit-Rate Digital Subscriber Lines (HDSL)," prepared by T1E1.4 Working Group in Digital Subscriber Lines (February 1994); M. Tomlinson, "New Automatic Equalisers Employing Modulo Arithmetic," *Electronics Letters*, vol. 7, nos. 5/6, pp. 138 (Mar. 25, 1971); R. Price, "Non-Linearly Feedback-Equalized PAM v. Capacity for Noisy Filter Channels," *Proc. 1972 IEEE International Conference on Communications*, p. 22–12

(June 1972); G. Ungerboeck, "Channel Coding With Multi-Level/Phase Signals," *IEEE Transactions on Information Theory*, vol. IT-28, p. 55 (January 1982); R. W. Lucky, J. Salz and E. J. Weldon, Jr., "Principles of Data Communication," (1968); A. J. Viterbi and J. K. Omura, "Principles of Digital Communications and Coding," (1979); Simon Haykin, "Communication Systems," (1983); M. Schwartz, "Information Transmission, Modulation, and Noise," (4th Ed. 1990); Jerry D. Gibson, "Digital and Analog Communications," (2nd Ed. 1993); Robert G. Winch, "Telecommunication Transmission Systems," (1993); Jacky S. Chow, Jerry C. Tu and John M. Cioffi, "A Discrete Multitone Transceiver System for HDSL Applications," *Journal on Selected Areas in Communications*, vol. 9, no. 6, p. 895 (August 1991); U.S. Pat. No. 5,414,733, "Decision Feedback Equalizer Employing Fixed Ratio Postcursor Taps for Minimizing Noise and Intersymbol Interference in Signals Conveyed Over High Speed Data Service Loop," issued to M. Turner. In FIG. 2, these conventional transmitter and receiver components are shown by encoding/pre-equalization ("Encoder") block 311 and equalization/decoding block ("decoder") 325.

In FIG. 2, transmitter 310 processes a first signal A characterized by a first baud rate $f_A$. Receiver 320 receives a second signal B characterized by second baud rate $f_B$. In a preferred embodiment, the first signaling rate $f_A$ is greater than the second signaling rate $f_B$. Signals A and B are thus characterized by partially overlapped bandwidths $BW_A$ and $BW_B$.

After encoding, and pre-equalization by block 311, signal A passes through digital-to-analog converter ("D/A") 313, which is operated at a sample rate equal to or greater than to the Nyquist rate of signal A, i.e., a rate equal to at least twice the highest possible frequency present in signal A. The analog signal produced by digital-to-analog converter 313 then passes through transmit analog filter ("Filter") 314, directional coupler 400, and then through bidirectional medium 500.

Signal A as shown in FIG. 2 is also supplied to echo canceler 330 via Encoder 311. Echo canceler 330 comprises delay unit 331, sampler 332 for sampling an input signal thereto at intervals fractionally spaced with respect to the baud rate, i.e., the intervals are spaced by fractional multiples (other than unity) of the baud rate, ("fractionally-spaced intervals"), and an echo replica unit 333. Delay unit 331 introduces a delay into the echo signal. In accordance with the invention, sampler 332 samples delayed signal A, at a sub-Nyquist rate equal to or greater than the Nyquist rate of the incoming signal, signal B. Echo replica unit 333 then generates the replicated echo samples to be subtracted from signal B in algebraic adder ("Σ") circuit 324. Echo replica unit 333 operates at the sample rate of signal B supplied from decimation filter 323 to adder circuit 324.

On the receive side, incoming signal B passes through receive analog filter 321 and analog-to-digital ("A/D") converter 322. Receive analog filter 321 is a low pass filter that filters out all transmit energy above the Nyquist rate corresponding to incoming signal B. In contrast to digital-to-analog converter 314, analog-to-digital converter 322 is operated at a sample rate equal to or greater than the Nyquist rate of signal B to insure that the information contained in signal B is properly recovered. When analog-to-digital converter 322 is operated at the sampling rate of digital-to-analog converter 313, a decimation filter 323 is used to reduce the sampling rate to a rate equal or greater than the Nyquist rate of signal B, but lower than the sampling rate of the echo signal. Echo samples generated by echo replica unit 333, which operates at an echo sub-Nyquist rate equal to the sample rate of signal B, are subtracted from incoming signal B in circuit 324 thereby yielding an echo canceled signal B at information sink 200.

Consequently, the method embodied by the apparatus of FIG. 2 performs echo cancellation over the partially overlapped bandwidths $BW_A$ and $BW_B$ at a sub-Nyquist sampling rate, thus improving echo cancellation efficiency by reducing computational overhead.

Figure 3:
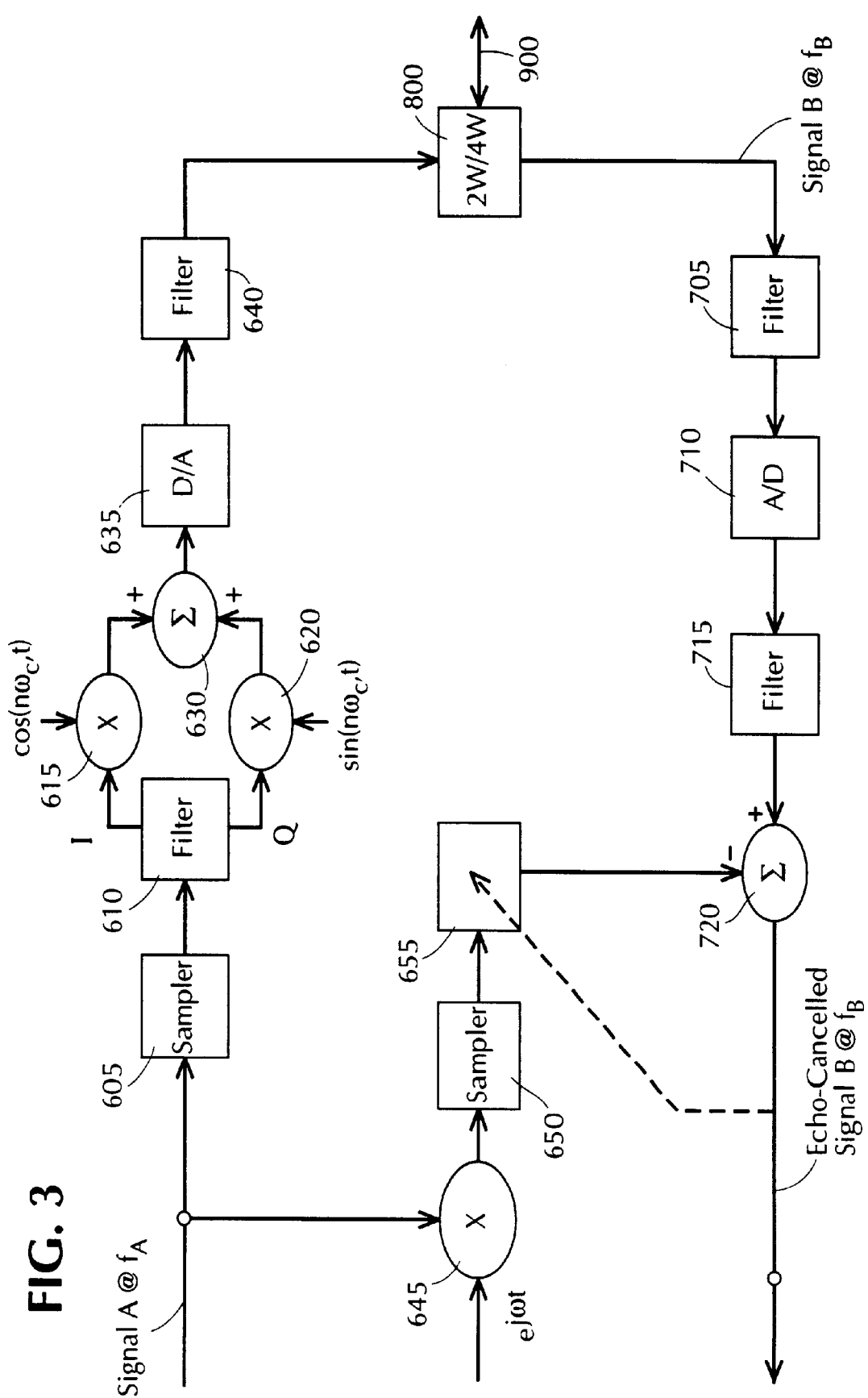
FIG. 3 is a third preferred embodiment of the present invention.

The method embodied by the apparatus shown in FIG. 3 performs echo cancellation in a communication system utilizing symmetrical information rates at asymmetrical signal rates and comprises the steps of: (a) transmitting a first signal in a first direction through a bidirectional medium at a first baud rate within a corresponding first bandwidth, the first signal characterized by an echo at the first baud rate within the first bandwidth, the step of transmitting the first signal further comprising the steps of (i) sampling the first signal at fractionally-spaced intervals, (ii) shaping the sampled signal, (iii) converting the shaped signal to an analog transmit signal at a first sampling rate, (iv) filtering the analog transmit signal, and (v) transmitting the filtered signal through a directional coupler; (b) receiving a second signal in a second direction through the bidirectional medium at a second baud rate within a corresponding second bandwidth such that the first and second bandwidths are partially overlapped, the step of receiving the second signal further comprising the steps of (i) receiving the second signal through a directional coupler; (ii) filtering the received second signal; (iii) converting the filtered signal into a digital signal representative of the second signal and characterized by a sampling rate that is equal to or greater than a Nyquist rate for the second signal; and (c) canceling the echo from the second signal, the canceling step further comprising the steps of (i) converting the first signal into a signal having a sampling rate less than a Nyquist sampling rate for the first signal, but equal to the sampling rate for the second signal, (ii) replicating an echo signal at a sampling rate equal to the sampling rate for the second signal, and (iii) subtracting the replicated echo signal from the digital signal representative of the second signal whereby the echo canceling is performed within the second bandwidth.

Referring to FIG. 3, baseband signal A, which can be encoded and pre-equalized as required by the specific application, is present at terminal 600 within a transceiver at a baud rate $f_A$ and is supplied to a sampler 605 for sampling the signal A at fractionally spaced intervals, e.g., T/3. Signal A passes through sampler 605, shaping filter 610, and modulators 615 and 620 to an algebraic adder circuit ("Σ") 630 to yield a quadrature-amplitude modulated ("QAM") passband signal. The circuit 630 can be a conventional summer. In accordance with the present invention, the echo canceling methods and apparatus thereof can be used with various modulation techniques including but not limited to QAM, pulse amplitude modulation ("PAM"), and carrierless AM/PM ("CAP").

The baseband signal A is also supplied to full spectrum modulator 645, thence via sampler 650 for sampling input signal at fractionally-spaced intervals, e.g., 2T/3, to echo replica unit 655. Full spectrum modulator 645 adds an appropriate frequency shift, while the 2T/3 sampler 650 increases the sample rate of baseband signal A to a rate equal or greater than the Nyquist rate of received signal B, but significantly less than the sample rate of the transmitted signal A as determined by the digital-to-analog converter ("D/A") 635. Echo replica unit 655 is thus operated at a sub-Nyquist rate, which is fractionally related to the sample rate of the digital-to-analog converter 635.

Digital-to-analog converter 635 samples modulated signal A at a sampling rate of T/3, i.e., a rate well above the Nyquist rate for signal A. The converted signal is supplied via transmit analog filter 640 and 2W/4W hybrid 800 to bidirectional transmission medium 900.

On the receive side, received signal B at baud rate $f_B$ passes through receive analog filter 705, analog-to-digital converter ("A/D") 710, and decimation filter 715. Receive analog filter 705 is a low pass filter that filters out all the received signal energy above the Nyquist rate corresponding to incoming signal B. Analog-to-digital converter 710, which is operated at the same sample rate as the digital-to-analog converter 635, converts signal B to a digital signal corresponding to signal B. Decimation filter 715 samples the digital signal at a rate substantially lower than the Nyquist rate corresponding to the transmitted signal A, but at a rate greater than or equal to the Nyquist rate of the received signal B. Decimation filter 715 thereby lowers the sample rate of the incoming signal B such that the sample rate of the digital signal output of converter 710 is equal to the sample rate of the echo signal replication generated by echo replica unit 655. The echo signal replication generated by echo replica unit 655 is then subtracted from digital signal B in algebraic adder circuit ("Σ") 720, yielding an echo canceled signal B at the transceiver terminal 730.

Consequently, the method embodied by the apparatus of FIG. 3 performs echo cancellation over partially overlapped bandwidths $BW_A$ and $BW_B$ at a sub-Nyquist sampling rate, thus improving echo cancellation efficiency by reducing computational overhead. For example, in a design constructed and arranged in accordance with FIG. 3 for use in the proposed HDSL2 service, sub-Nyquist sampling in the echo path reduces by one-half the number of calculations required by the echo canceler as compared to prior art echo cancelers operating at or above the Nyquist rate of the echo signal. We have demonstrated these results for $f_A$=517.33 kHz, $f_B$=310.4 kHz, and sampling rates for digital-to-analog and analog-to-digital converters equal to 1.552 MHZ. This reduction in computational overhead greatly reduces the cost of implementing echo cancellation techniques for the proposed HDSL2 service.

Thus, we have described novel methods and apparatus for echo cancellation in communication systems utilizing bidirectional transmission media.

Although the present invention has been described in connection with particular embodiments thereof, it is to be understood that additional embodiments, modifications, and applications thereof, which will be obvious to those skilled in the art are included within the spirit and scope of the present invention. While we have disclosed particular embodiments of the present invention, variations in procedural and structural detail within the scope of the appended claims and which are within the skill of those of ordinary skill in the communications art to provide, are possible, and we contemplate them. We have no intention to limit the scope of the appended claims to the abstract or to the exact disclosure herein presented.

What is claimed is:

1. A method for echo cancellation in a communication system utilizing a bidirectional transmission medium, said method including the steps of:

(a) transmitting a first signal in a first direction through said medium at a first signaling rate within a corresponding first bandwidth, said first signal characterized by an echo at said first signaling rate within said first bandwidth;

(b) receiving a second signal in a second direction through said medium at a second signaling rate within a corresponding second bandwidth, such that said first and second bandwidths are partially overlapped, said step of receiving said second signal further comprising the steps of:

(i) filtering said second signal such that all transmit energy above a Nyquist rate corresponding to said second signal is eliminated; and (ii) sampling said second signal at a sampling rate that is equal to or greater than said Nyquist rate for said second signal;

(c) canceling said echo from said second signal, said canceling step comprising the steps of:

(i) converting said first signal into a signal having a sampling rate less than a Nyquist sampling rate for said first signal, but equal to said sampling rate for said second signal;

(ii) replicating an echo signal at a sampling rate equal to said sampling rate for said second signal; and (iii) subtracting said replicated echo signal from said second signal; whereby said echo canceling is performed within said second bandwidth.

2. A method for echo cancellation in a communication system utilizing a bidirectional transmission medium and transmitting information at symmetrical information rates, said method including the steps of:

(a) transmitting a first signal in a first direction through said medium at a first signaling rate within a corresponding first bandwidth, said first signal characterized by an echo at said first signaling rate within said first bandwidth;

(b) receiving a second signal in a second direction through said medium at a second signaling rate within a corresponding second bandwidth, such that said first and second bandwidths are partially overlapped, said step of receiving said second signal further comprising the steps of:

(i) filtering said second signal such that all transmit energy above a Nyquist rate corresponding to said second signal is eliminated; and (ii) sampling said second signal at a sampling rate that is equal to or greater than a Nyquist rate for said second signal; and (c) canceling said echo from said second signal, said canceling step further comprising the steps of:

(i) converting said first signal into a signal having a sampling rate less than a Nyquist sampling rate for said first signal, but equal to said sampling rate for said second signal;

(ii) replicating an echo signal at a sampling rate equal to said sampling rate for said second signal; and, (iii) subtracting said replicated echo signal from said second signal; whereby said echo canceling is performed within said second bandwidth.

3. A method for echo cancellation in a communication system utilizing a bidirectional transmission medium and transmitting information at symmetrical information rates, said method including the steps of:

(a) transmitting a first signal in a first direction through said medium at a first baud rate within a corresponding first bandwidth, said first signal characterized by an echo at said first baud rate within said first bandwidth, said step of transmitting said first signal further comprising the steps of:

(i) sampling said first signal at fractionally-spaced intervals;

(ii) shaping said sampled signal;
(iii) converting said shaped signal to an analog transmit signal at a transmit sampling rate;
(iv) filtering said analog transmit signal; and
(v) transmitting said filtered analog transmit signal through a directional coupler to said medium;

(b) receiving a second signal in a second direction through said medium at a second baud rate within a corresponding second bandwidth, such that said first and second bandwidths are partially overlapped, said step of receiving said second signal further comprising the steps of:
(i) receiving said second signal through a directional coupler;
(ii) filtering said second signal;
(iii) converting said filtered second signal into a digital signal representative of said second signal and characterized by a sampling rate that is equal to or greater than a Nyquist rate for said second signal; and;

(c) canceling said echo from said second signal, said canceling step comprising the steps of:
(i) converting said first signal into a signal having a sampling rate less than a Nyquist sampling rate for said first signal, but equal to said sampling rate for said second signal;
(ii) replicating an echo signal at a sampling rate equal to said sampling rate for said second signal; and,
(iii) subtracting said replicated echo signal from said digital signal representative of said second signal; whereby said echo canceling is performed within said second bandwidth.

4. A method for echo cancellation in a communication system utilizing a bidirectional transmission medium and transmitting information at symmetrical information rates, said method including the steps of:

(a) transmitting a first signal in a first direction through said medium at a first baud rate within a corresponding first bandwidth, said first signal characterized by an echo at said first baud rate within said first bandwidth, said step of transmitting said first signal further comprising the steps of:
(i) sampling said first signal at fractionally-spaced intervals;
(ii) shaping said sampled signal;
(iii) modulating said shaped, signal;
(iv) converting said modulated signal to an analog transmit signal at a transmit sampling rate;
(v) filtering said analog transmit signal; and
(vi) transmitting said filtered analog transmit signal through a directional coupler to said medium;

(b) receiving a second signal in a second direction through said medium at a second baud rate within a corresponding second bandwidth, such that said first and second bandwidths are partially overlapped, said step of receiving said second signal further comprising the steps of:
(i) receiving said second signal through a directional coupler;
(ii) filtering said second signal;
(iii) converting said filtered second signal into a digital signal representative of said second signal and characterized by a sampling rate that is equal to or greater than a Nyquist rate for said second signal; and;

(c) canceling said echo from said second signal, said canceling step comprising the steps of:
(i) converting said first signal into a signal having a sampling rate less than a Nyquist sampling rate for said first signal, but equal to said sampling rate for said second signal;
(ii) replicating an echo signal at a sampling rate equal to said sampling rate for said second signal; and,
(iii) subtracting said replicated echo signal from said digital signal representative of said second signal; whereby said echo canceling is performed within said second bandwidths.

5. An apparatus for echo cancellation in a communication system utilizing a bidirectional transmission medium, said apparatus including:

(a) a transmitter for transmitting a first signal in a first direction through said medium at a first signaling rate within a corresponding first bandwidth, said first signal characterized by an echo at said first signaling rate within said first bandwidth;

(b) a receiver for receiving a second signal in a second direction through said medium at a second signaling rate within a corresponding second bandwidth, such that said first and second bandwidths are partially overlapped, said receiver further comprising:
(i) an analog filter for filtering said second signal, such that all transmit energy above a Nyquist rate corresponding to said second signal is eliminated; and,
(ii) an analog-to-digital converter for sampling said second signal, at a sampling rate that is equal to or greater than said Nyquist rate for said second signal; and, (c) an echo canceler for canceling said echo from said second signal, said echo canceler comprising:
(i) a sampler for sampling said first signal at fractionally-spaced intervals to convert said first signal into a signal having a sampling rate less than a Nyquist sampling rate for said first signal, but equal to said sampling rate for said second signal;
(ii) an echo replica unit for replicating an echo signal at a sampling rate equal to said sampling rate for said second signal; and,
(iii) an algebraic adder circuit for subtracting said replicated echo signal from said second signal; the combination being so constructed and arranged that said echo canceling is performed within said second bandwidth.

6. An apparatus for echo cancellation in a communication system utilizing a bidirectional transmission medium and transmitting information at symmetrical information rates, said apparatus comprising:

(a) a transmitter for transmitting a first signal in a first direction through said medium at a first signaling rate within a corresponding first bandwidth, said first signal characterized by an echo at said first signaling rate within said first bandwidth;

(b) a receiver for receiving a second signal in a second direction through said medium at a second signaling rate within a corresponding second bandwidth, such that said first and second bandwidths are partially overlapped, said receiver further including:
(i) an analog filter for filtering said second signal such that all transmit energy above a Nyquist rate corresponding to said second signal is eliminated;
(ii) an analog-to-digital converter for sampling said second signal at a sampling rate that is equal to or greater than a Nyquist rate for said second signal; and, (c) an echo canceler for canceling said echo from said second signal, said echo canceler comprising:

(i) a sampler for sampling said first signal at fractionally-spaced intervals to convert said first signal into a signal having a sampling rate less than a Nyquist sampling rate for said first signal, but equal to said sampling rate for said second signal;

(ii) an echo replica unit for replicating an echo signal at a sampling rate equal to said sampling rate for said second signal; and, (iii) an algebraic adder circuit for subtracting said replicated echo signal from said second signal; the combination being so constructed and arranged that said echo canceling is performed within said second bandwidth.

7. An apparatus for echo cancellation in a communication system utilizing a bidirectional transmission medium and transmitting information at symmetrical information rates, said apparatus comprising:

(a) a transmitter for transmitting a first signal in a first direction through said medium at a first baud rate within a corresponding first bandwidth, said first signal characterized by an echo at said first baud rate within said first bandwidth, said transmitter further comprising:

(i) a sampler for sampling said first signal at fractionally-spaced intervals;

(ii) a shaping filter for shaping said sampled signal;

(iii) a digital-to-analog converter for converting said shaped signal to an analog transmit signal at a transmit sampling rate;

(iv) a transmit analog filter for filtering said analog transmit signal;

(v) a directional coupler;

(b) a receiver for receiving a second signal in a second direction through said medium at a second baud rate within a corresponding second bandwidth such that said first and second bandwidths are partially overlapped, said receiver including:

(i) a directional coupler;

(ii) a receive analog filter for filtering said second signal; and (iii) an analog-to-digital converter for converting said second signal into a digital signal representative of said second signal; and (c) an echo canceler for canceling said echo from said second signal, said echo canceler comprising:

(i) a sampler for sampling said first signal at fractionally-spaced intervals to convert said first signal into a signal having a sampling rate less than a Nyquist sampling rate for said first signal, but equal to said sampling rate for said second signal;

(ii) an echo replica unit for replicating an echo signal at a sampling rate equal to said sampling rate for said second signal; and (iii) an algebraic adder circuit for subtracting said replicated echo signal from said digital signal; the combination being so constructed and arranged that said echo canceling is performed within said second bandwidth.

8. An apparatus for echo cancellation in a communication system utilizing a bidirectional transmission medium and transmitting information at symmetrical information rates, said apparatus comprising:

(a) a transmitter for transmitting a first signal in a first direction through said medium at a first baud rate within a corresponding first bandwidth, said first signal characterized by an echo at said first baud rate within said first bandwidth, said transmitter further comprising:

(i) a sampler for sampling said first signal at fractionally-spaced intervals;

(ii) a shaping filter for shaping said sampled signal;

(iii) a modulator for modulating said shaped signal;

(iv) a digital-to-analog converter for converting said modulated signal to an analog transmit signal at a transmit sampling rate;

(v) a transmit analog filter for filtering said analog transmit signal;

(vi) a directional coupler;

(b) a receiver for receiving a second signal in a second direction through said medium at a second baud rate within a corresponding second bandwidth such that said first and second bandwidths are partially overlapped, said receiver including:

(i) a directional coupler;

(ii) a receive analog filter for filtering said second signal; and (iii) an analog-to-digital converter for converting said second signal into a digital signal representative of said second signal; and (c) an echo canceler for canceling said echo from said second signal, said echo canceler comprising:

(i) a sampler for sampling said first signal at fractionally-spaced intervals to convert said first signal into a signal having a sampling rate less than a Nyquist sampling rate for said first signal, but equal to said sampling rate for said second signal;

(ii) an echo replica unit for replicating an echo signal at a sampling rate equal to said sampling rate for said second signal; and (iii) an algebraic adder circuit for subtracting said replicated echo signal from said digital signal; the combination being so constructed and arranged that said echo canceling is performed within said second bandwidth.

* * * * *